Aug. 24, 1965  R. L. GODSHALK  3,202,184
FLUE AND DUCT CONSTRUCTION
Filed Aug. 18, 1960  3 Sheets-Sheet 1
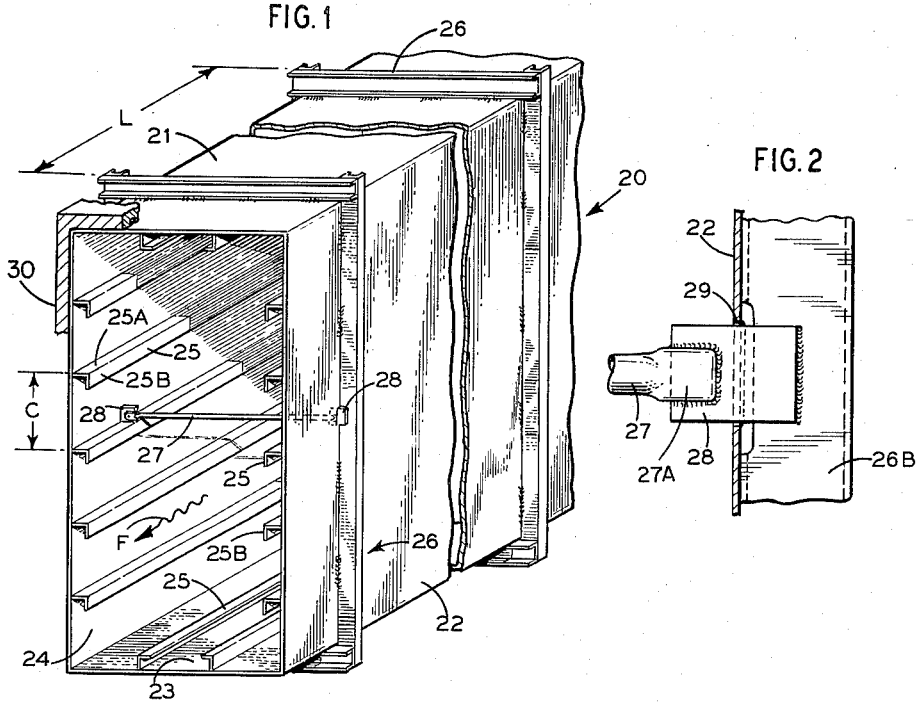
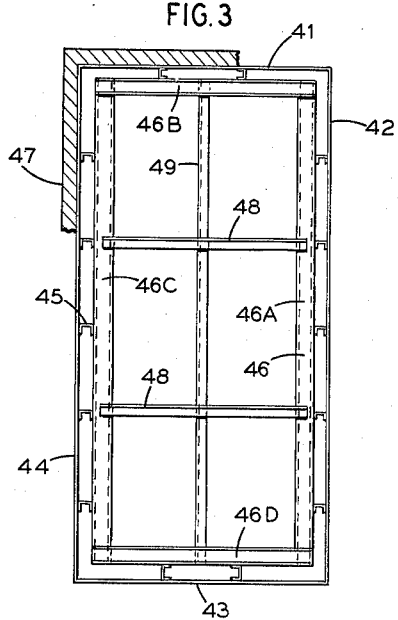
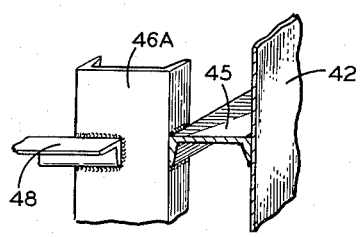
INVENTOR.
Russell L. Godshalk
BY
ATTORNEY

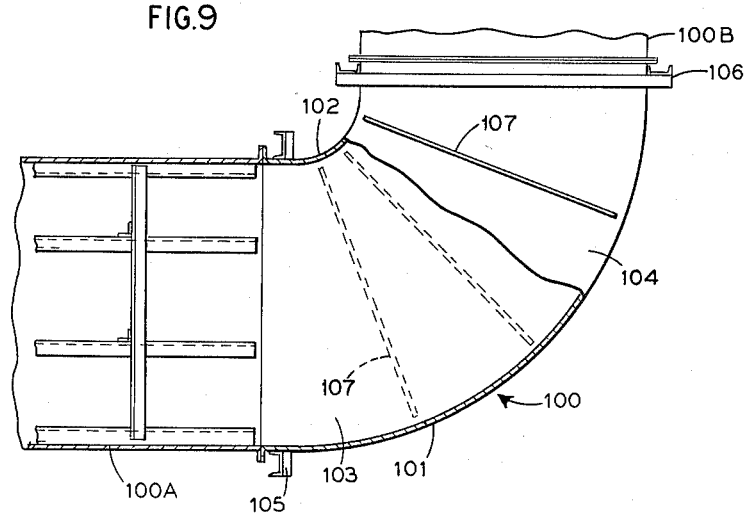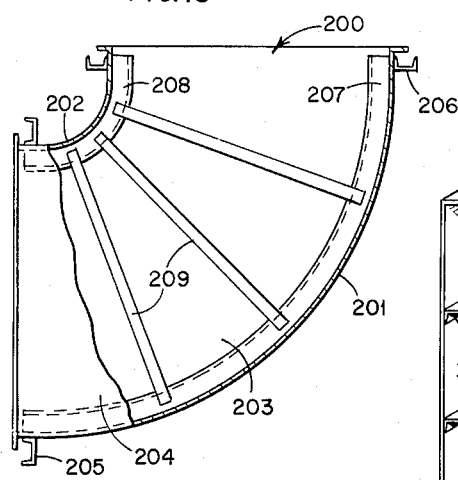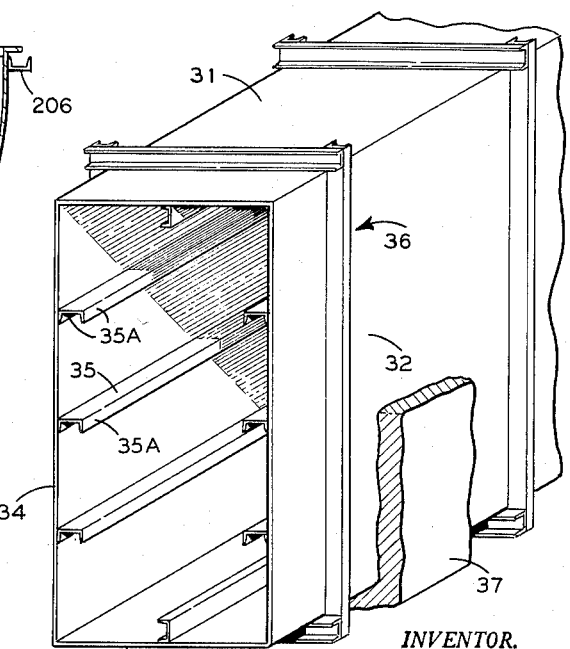

Aug. 24, 1965   R. L. GODSHALK   3,202,184
FLUE AND DUCT CONSTRUCTION
Filed Aug. 18, 1960   3 Sheets-Sheet 3
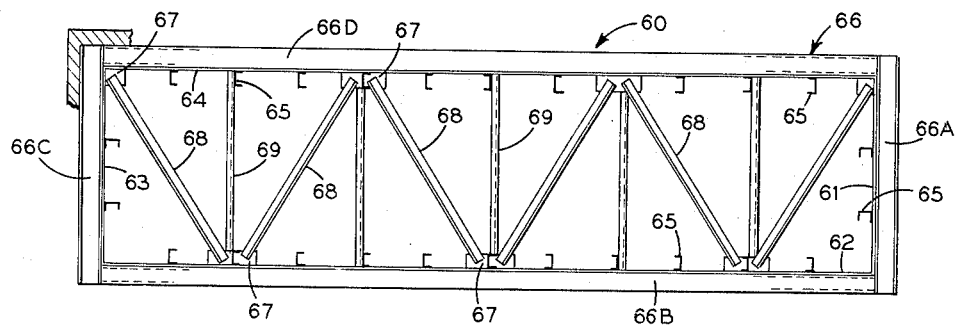
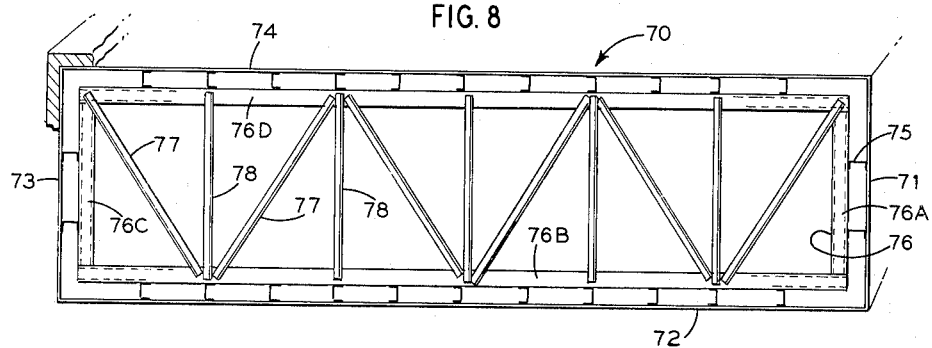
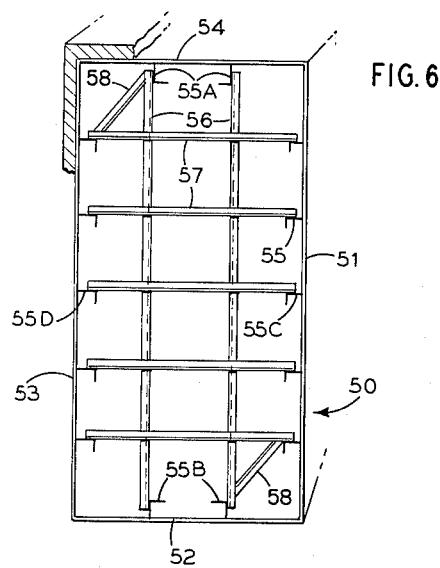
INVENTOR.
Russell L. Godshalk
BY
ATTORNEY

United States Patent Office 3,202,184
Patented Aug. 24, 1965

3,202,184
FLUE AND DUCT CONSTRUCTION
Russell L. Godshalk, Akron, Ohio, assignor to The Babcock & Wilcox Company, New York, N.Y., a corporation of New Jersey
Filed Aug. 18, 1960, Ser. No. 50,353
2 Claims. (Cl. 138—172)

This invention relates generally to conduits for the transport of fluids and more specifically to relatively thin, flat plate flues and ducts of large cross-sectional area, constructed and arranged for conducting a fluid therethrough under pressure.

With the trend towards higher and higher capacity steam generators, boilers and the like, it has been necessary to proportionately increase the cross-sectional flow areas of the flues and ducts for handling the gases and/or air for such units so that it is not uncommon for the cross-sectional flow area of such ducts to attain dimensions in the order of 5 ft. x 20 ft., 10 ft. x 30 ft. and up. Obviously, the flat sheet metal plates for making flues and ducts of the size herein contemplated require stiffeners to effect the required degree of stability and rigidity necessary for resisting the forces acting on them.

Heretofore it had been customary to stiffen such flues and ducts by means consisting only of bars or beams positioned normal to their longitudinal axis, and securing them to the external surface of the plates on relatively close centers. This construction resulted in ducts having a series of reinforcing bands or hoops exteriorly embracing the conduit wherein the size of these bands and the spacings longitudinally of the duct were determined by the forces acting on the section. Generally such prior duct arrangements required such bands or hoops to be spaced at relatively close intervals. While ducts and flues so constructed can be designed so as to be sufficiently strong to withstand the internal pressure of the fluid flowing therethrough, difficulty has been encountered in the handling of them during transportation, and in erecting and connecting them to other components of the boiler. This was because the reinforcing bands or hoops circumscribing the conduit did not adequately resist the tendency of the flues or ducts to twist or distort out of rectangularity. Obviously, as the size and the cross-sectional area of these conduits are increased, the problems associated with handling them become more aggravated.

A further disadvantage inherent in stiffening flues and ducts in the known manner resulted in their having numerous interruptions in the planar surfaces occasioned by the external stiffening bands. Consequently in applying the insulation it had to be either humped over the hoops or applied over a roadmesh extended across the hoops. In either case the application of the insulating material proved to be a costly and time consuming operation.

Further, the prior known method of reinforcing such conduits by externally placed hoops or bands did not lend itself to the manufacture of ducts in knocked down sections, since such external hoops are best applied after the sides of the duct were assembled. This generally necessitated the ducts to be shop assembled and shipped to the installation site as assembled sections. The transportation of such assembled duct sections from the fabricating plant to boiler site oftentimes was uneconomical since it resulted in shipments weighing less than the car loading limits.

As the horizontal leg portion of the reinforcing band or hoop of the known constructions had to be strong enough to withstand the loading due to the weight of the duct and the installation in addition to the weight of the stiffeners themselves, it frequently happened that in very long or wide flue or duct spans the horizontal leg of the hoop became so massive and cumbersome as to be impractical. In such cases, trusses have been used to distribute the load, and thereby reduce the overall space requirements of the conduit. In these truss arrangements, the truss bars had to project through the sheet metal sides of the duct in order to transmit the forces to the horizontal legs which functioned as the truss chords. Piercing of the duct plate to accommodate for the truss bars was expensive, especially since at each of these points the truss bars and adjacent portions of the conduit had to be seal welded to insure that the conduit would be fluid tight.

Therefore an object of this invention is to overcome the foregoing disadvantages by providing, in a duct or flue of relatively large cross-sectional area, a system of internal stiffeners extending in a direction parallel to the longitudinal axis of the duct, with the loading or reaction of the internal stiffeners then transmitted to widely spaced internal girth members, internal tie bars, external girth members or to a combination of these members.

Another object is to provide conduit sections of the character herein described having a system of longitudinally extending internal stiffeners which will resist the tendency of the component parts to twist or buckle during handling and fabrication.

Another object of the invention is to provide a construction which enhances the shipment of the conduit in knocked-down sections so as to take fuller advantage of the more economical loading and shipping of flat plate sections.

Another object is to provide a conduit construction which is particularly adapted to be supported by an internal truss-like system and in which the truss bars are not required to pierce the duct plate in order to transmit the loading to the girth members.

Another object resides in providing a reinforced flue and duct section in which the outer surface has substantially greater expanses of uninterrupted flat plate areas to facilitate the application of insulating materials.

In accordance with this invention the foregoing objects, other features, and advantages are attained with conduit sections having internal stiffeners, such as angles or other rolled sections, welded on the inner surface of the conduit. These internal stiffeners are arranged so that they extend in a direction generally parallel to the fluid flowing through the conduit. In addition, angles or other rolled sections are disposed normal to the internal stiffeners, so that when assembled they co-operate to form a continuous band or hoop substantially co-extensive with the periphery of the duct to resist the reaction loading on the internal stiffeners.

Thus the duct stiffener arrangement, as described co-operates to provide a fully stiffened duct plate which facilitates fabrication and assembly and thereby eliminates to a significant extent the amount of field welding incidental to the assembly of such ducts.

Also this construction facilitates shipment of respective conduit components knocked down since the tendency for bending or distortion during handling and stacking of the duct plates is substantially eliminated.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a perspective view of the duct section constructed and arranged in accordance with this invention.

FIG. 2 is an enlarged detail view of the construction employed in the duct arrangement of FIG. 1.

FIG. 3 is a front view of a modified duct arrangement.

FIG. 4 is an enlarged detail of the construction employed in the duct arrangement of FIG. 3.

FIG. 5 is another modified form of the invention.

FIG. 6 is still another modified form of the invention.

FIG. 7 illustrates a front view of a truss arrangement for use in a relatively wide span duct employing the basic duct construction shown in FIG. 5.

FIG. 8 is a modified front end view of a truss arrangement for use in a relatively wide span duct employing the basic duct construction of the type shown in FIG. 3.

FIG. 9 is a duct bend section constructed and arranged in accordance with this invention, in which a portion thereof is broken away.

FIG. 10 is a modified form of the duct bend section shown in FIG. 9, including a truss-like arrangement for use with a relatively wide span duct or flue bend.

The various modifications of the illustrated flue and duct sections have particular application for use in handling gases and/or combustion air in vapor generators. A typical flue or duct section is constructed, for example, of 10 ga., 12 ga., 3/16" or 1/4" thick steel plate and is generally of rectangular configuration constructed to withstand internal pressures in the range of 10" to 80" of water at temperatures ranging to 700° F. or higher. Typical duct sections as shown in FIGS. 1, 3, 5 and 6 are arranged and constructed so as to have a comparatively large cross-sectional flow area, for example 7 ft. x 14 ft. for an area of 98 sq. ft. However, it is to be understood that while the foregoing dimensions, temperatures and pressure ranges are illustrative of a particular adaptation of a duct arrangement hereindescribed, they are illustrative only and may be varied in accordance with the design considerations of a particular operating unit including those of wind loading and suction operation.

Referring to FIG. 1, there is illustrated a straight length of duct section 20 constructed in rectangularly disposed plates 21, 22, 23 and 24 which are welded along their adjoining edge portions in the assembled position to form a fluid tight conduit. Secured to the inner face of each plate 21, 22, 23 and 24 are internal stiffeners 25 extending longitudinally of the duct in a direction parallel to the flow of gas or air, which is indicated by the arrow "F." In FIG. 1, the internal stiffeners 25 are illustrated as structural steel angles having one leg portion 25A thereof connected normal to the adjoining duct plate, and the other leg 25B thereof being spaced from and disposed parallel to the adjoining plate. Preferably, legs 25B of the angles 25 connected to the upright plates 22, 24 are turned downward so as to avoid the formation of a gutter-like structure within which dust or ash would tend to accumulate. The respective angles or stiffeners 25 are secured internally of the duct by welding leg 25A to the adjoining plate, as with a 1/4 inch weld, 2 inches long and spaced on 9 inch centers. These longitudinally extending members 25 thus secured, each to their respective plates, provide the requisite stiffening for the assembly.

In accordance with this invention, the loading to which the internal stiffeners 25 are subjected is transmitted to and collected by other rolled structural sections or stiffeners 26 secured to the outer surface of the respective plates. These external stiffeners or girth members 26 are illustrated as being formed of channel sections which, in the assembled position with respect to the duct plates, define a girth reinforcing band or loop. In accordance with this invention, the loops thus formed are spaced longitudinally of the duct on widely spaced centers such that the distance "L" between adjacent loops is equal to at least 2C, where "C" is the distance between similar points on adjacent internal stiffeners along a given plate. See FIG. 1.

If desired, the size of the channels forming the external girth members 26 required to take the loading transmitted by the stiffeners 25 can be reduced by the installation of a tie-bar 27, which forms an intermediate support, as shown in FIG. 1. The construction detail for securing the tie-bar 27 to external stiffener 26 is illustrated in FIG. 2. As shown, a gusset plate 28 is welded to each of the opposed upright members 26B of the reinforcing band or loop 26, and extends into the duct through a slotted opening 29 in the adjacent duct plates 22 and 24. The tubular tie-bar 27 has its flattened end portions 27A welded to opposed gussets 28. With the tie-bar 27 thus welded in position to the respective gusset plates 28, the opening 29 in the duct plates through which the respective gussets project is welded closed, the web of the channel 26B being notched to facilitate the welding. Completing the duct assembly is a covering of insulating material 30 which is applied directly to the outer surface of the duct and humped as necessary over the widely spaced external stiffeners or hoops 26.

In the form of the invention illustrated in FIG. 5, the respective plates 31, 32, 33 and 34 have welded along their internal surfaces longitudinally extending channel members 35, rather than the angles described with reference to FIG. 1. In this form of the invention the legs 35A of the channels extend downwardly so as to not form gutters as hereinbefore described. In all other respects, the construction of the duct illustrated in FIG. 5 is similar, as hereinabove described with reference to FIG. 1, and if desired a tie-bar (not shown) may also be added to reduce the sizing of the external girth forming members 36. Insulating material 37 is provided for an outer covering as hereinbefore described.

Referring to FIG. 3, there is shown another modification of duct construction in which rectangularly disposed plates 41, 42, 43 and 44, are assembled in position, seal welded along their adjoining edges, and reinforced by longitudinally extending channel members 45 secured along the inner surfaces of the respective plates in a manner as described with reference to the duct section of FIG. 5. In this form of the invention, however, a plurality of girthwise stiffeners 46, for collecting the reaction loading of the longitudinal stiffeners 45, are disposed within the duct on widely spaced centers as hereinbefore described. As shown, the girth stiffeners 46 comprise channel members 46A, 46B, 46C, 46D disposed normal to the longitudinally extending stiffeners 45. As shown in FIG. 4, the one flange of the internal stiffeners 45 is welded to the adjacent plate 42, and the other flange is welded to the girth member 46A. In this form of the invention the exterior surfaces of the duct are formed as smooth and uninterrupted plane surfaces; and this construction facilitates even more the application of an insulating cover 47.

If desired, transversely extending angle members 48 may be provided to connect between opposed channel portions 46A, 46C and an angle member 49 disposed between channel portions 46B and 46D. The use of tie angles 48, 49 reduces the channel sizes otherwise required to form the internal girth member 46.

In the duct arrangement 50, shown in FIG. 6, the rectangularly disposed plates 51, 52, 53, 54 are reinforced by internal longitudinally extending angle members 55 in a manner as described with reference to the duct section of FIG. 1. However, in this form a plurality of perpendicularly disposed angle tie members 56, 57 are provided to resist the load imposed on the longitudinally extending internal stiffeners 55. As shown, tie angles 56 extend between opposed stiffeners 55A, 55B which extend along the top and bottom plates 54, 52, respectively, and tie angles 57 extend between opposed stiffeners 55C, 55D connected to opposed side plates 51, 53, respectively. Diagonal braces 58 connect angularly disposed portions of tie angles 56, 57 for squaring the lattice configuration formed by the perpendicularly disposed tie angles 56, 57. The duct construction 50, like that shown in FIG. 3, provides the duct section with a smooth and continuous outer surface to which a covering of insulation material 58 may be directly applied.

FIG. 7 illustrates a modified form of the invention which is particularly applicable for very wide duct or flue sections. The duct arrangement 60 of FIG. 7 employs external girth members 66 and horizontally extending stiffeners 65 similarly disposed to those shown in FIG. 5. Essentially the rectangularly disposed plates 61, 62, 63, 64 are seal welded along their respective adjoining edge portions and are each stiffened by a plurality of longitudinally extending internal stiffeners 65, formed of channel sections and connected to their respective adjoining plate as hereinbefore described with reference to the showings of FIG. 5. An external girth member 66 formed of rectangularly disposed channel members 66A, 66B, 66C, 66D collects the reaction loading imposed on stiffeners 65. As hereinbefore described, a plurality of girth members 66 are longitudinally spaced along the duct 60 on relatively widely spaced centers. Because of the very long span or width of the horizontal girth members 66D, 66B, truss-like members are provided to distribute the load, and to minimize the size of the horizontal girth sections which would be otherwise required. In this form, gusset plates 67 are connected to and alternately spaced along the upper and lower horizontal girth members 66D, 66B, respectively, each gusset being extended into the duct through an appropriate opening formed in the adjacent duct plate. With the gusset 67 in position, the gusset openings of the respective duct plates are welded closed essentially as described in connection with FIG. 2. Diagonal truss bars 68 in the form of angle members connect to opposed alternately spaced gussets 67 to distribute the load. Vertical truss or tie bars 69 extend between the truss points and the internal stiffeners 65 disposed opposite the respective truss points.

The duct 70 of FIG. 8 constitutes a modified truss arrangement for use in long span flue and duct constructions with internal girth members 76 of the type shown and described with reference to FIG. 3. In this form the duct 70 is constructed of rectangularly disposed plates 71, 72, 73, 74, each plate being stiffened by longitudinally extending channel members 75 in the manner hereinbefore described with reference to FIGS. 3 and 7. Collecting the loading of the longitudinally extending stiffeners are a plurality of internal girth members 76 each being formed of rectangularly disposed channel members 76A, 76B, 76C, 76D. These girth members are spaced on comparatively wide centers in the manner discussed with reference to FIGS. 1, 3 and 4.

To stabilize the duct against distortion and the loading of the top and bottom plates, diagonal truss bracings 77 in the form of angle bars are utilized in addition to vertical tie bars 78. As shown, the separate system of truss bracings 77 is used between adjacent tie points to provide duct stability. In this arrangement, the truss bracings 77 and tie bars 78 are secured directly to channel members 76B and 76D of the internal girth structure.

FIG. 9 illustrate the application of the instant invention to a duct bend. As shown, duct bend 100 connects together a pair of duct straights 100A, 100B disposed at right angles. Duct straights 100A and 100B are of the type described with respect to FIG. 3.

The duct bend 100 is formed of a pair of arcuate duct plates 101 and 102 and a pair of opposed flat end plates 103, 104 connected therebetween. In this form of the invention the arcuate plates 101, 102 of the bend are utilized as a curved beam section and thus the inherent strength and stiffening due to their shape obviates the need for additional stiffening. The reaction loading acting on the duct plates in this form is collected by girth members 105, 106 formed of rectangularly disposed channel members which are positioned adjacent each open end. To stiffen the flat end plates 103, 104, a plurality of radially disposed stiffening bars 107 are secured on edge to the outer surface of the plates 103, 104.

FIG. 10 illustrated a wide span duct turn having a basic construction as described with respect to FIG. 9. Essentially duct 200 of FIG. 10 consists of rectangularly disposed arcuate plate sections 201 and 202 and connected end plates 203, 204, with external girth members 205, 206, disposed adjacent each of the open ends thereof to collect the load imposed on each of the duct plates. This duct bend 200 differs from the duct turn 100 of FIG. 9, only in that the arcuate plates 201, 202 have a relatively wider span or width than the corresponding arcuate plates 101, 102 of FIG. 9. Therefore, in accordance with the form of FIG. 10, longitudinal stiffeners 207 and 208 are secured to the internal surface of arcuate plates 201, 202, respectively, intermediate their edge portions which adjoin the adjacent end plates 204, 203. As shown, stiffeners 207, 208 may consist either of an angle section or other suitable rolled members. As shown, angle bars are employed and have their respective leg portions secured to the adjacent duct plates 201, 202, in the manner described with respect to FIG. 1. Radially extending tie bars 209 extend transversely of the bend and connect with the oppositely disposed internal stiffeners 207, 208. Thus for duct bends or turns having relatively wide spans, the internal stiffeners 207, 208 and 209 function as a truss-like arrangement to distribute or resist the load acting on the duct bend.

The duct bend herein described, like that of the duct straight, is covered with suitable insulation (not shown).

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A duct comprising plate means having their edge portions joined throughout their length to form an elongated fluid-tight tubular section, a plurality of spaced stiffeners extending longitudinally of said tubular section, said stiffeners being fixedly connected to the internal surface of said tubular section and arranged parallel to the flow of fluid therethrough, and a plurality of longitudinally spaced girth members disposed normal to said longitudinally extending stiffeners and fixedly positioned relative to said plate means and said stiffeners and connected at spaced intervals to the external surface of said tubular section, each of said girth members forming a closed rigid member resisting the tendency of said longitudinally extending stiffeners and said plate means to move outwardly.

2. The invention as defined in claim 1, wherein the span between adjacent pairs of external girth members is equal to at least twice the center-to-center distance between adjacent pairs of internal stiffeners.

References Cited by the Examiner

UNITED STATES PATENTS

| | | | |
|---|---|---|---|
| 907,219 | 12/08 | Biles | 138—148 XR |
| 1,191,547 | 7/16 | Wiedeman | 138—170 XR |
| 1,293,208 | 2/19 | Ryan | 138—177 XR |
| 1,963,056 | 6/34 | Wilcox | 138—177 XR |
| 2,187,959 | 1/40 | Williams | 50—334 XR |
| 2,722,948 | 11/55 | Thompson | 138—148 |

FOREIGN PATENTS 719,697  11/31  France.

LEWIS J. LENNY, *Primary Examiner.*

EDWARD V. BENHAM, *Examiner.*